United States Patent [19]

Warner

[11] Patent Number: 4,905,406

[45] Date of Patent: Mar. 6, 1990

[54] METHOD AND APPARATUS FOR ATTRACTING INSECTS

[76] Inventor: Thomas J. Warner, 4234 Alden Drive, South, Edina, Minn. 55416

[21] Appl. No.: 320,580

[22] Filed: Mar. 8, 1989

[51] Int. Cl.⁴ .......................... A61L 9/04; A42B 1/06
[52] U.S. Cl. ........................................ 43/107; 43/111; 43/114; 43/132.1; 119/156; 2/185 R; 2/199
[58] Field of Search ................. 43/107, 111, 114, 119, 43/124, 132.1, 132; 119/156, 160, 87; 2/4, 171.2, 209.1, 185 R, 199; 273/183

[56] References Cited

U.S. PATENT DOCUMENTS

| | | | |
|---|---|---|---|
| 2,177,670 | 11/1937 | Peirson | 43/107 |
| 3,216,159 | 11/1965 | Briese | |
| 3,437,339 | 5/1966 | Starck | 2/199 |
| 3,896,995 | 7/1975 | Lelicoff | 43/132.1 |
| 4,063,740 | 12/1977 | Mader | 273/182 |
| 4,098,509 | 7/1978 | Van Krevelen | 273/183 |
| 4,214,318 | 7/1980 | Gomez | 2/209.1 |
| 4,406,040 | 9/1983 | Cannone | 2/199 |
| 4,665,568 | 5/1987 | Stutes | 2/199 |

*Primary Examiner*—Richard K. Seidel
*Assistant Examiner*—Michael W. Starkweather
*Attorney, Agent, or Firm*—Hugh D. Jaeger

[57] ABSTRACT

Method and apparatus for attracting insects to a point above a hat and above a person's head. The apparatus includes a member on one end coated with an insect attractant and a clip means at the other end, such as for clipping onto a hat. The insect attractant can be of a scent to attract insects, such as gnats, mosquitos or flies, and can resemble such scents as body sweat on the skin, natural scents of a person, or scents of male and female insects, thereby attracting both sexes of the insects. The clip on the other end can be a spring clip or an alligator clip, or a head-encircling spring structure.

15 Claims, 8 Drawing Sheets

METHOD AND APPARATUS FOR ATTRACTING INSECTS

BACKGROUND OF THE INVENTION

1. Field of the Invention

The present invention pertains to a method and apparatus for attracting insects away from and to a top point above a person's body, and more particularly, pertains to a member clipped to a person's hat and having a scented member at the other end for attracting insects.

2. Description of the Prior Art

The problem frequenting sports enthusiasts, such as golfers, fishermen, softball players, etc., has been gnats surrounding one's face during the playing of the game. Prior attempts to rid oneself of the gnats would include spraying with bug repellant, waving a hat back and forth, or lifting the hat to above one's head to attract the gnats. These prior art methods have been unacceptable in that the gnats or insects will still be attracted to one's head.

The present invention overcomes the disadvantages of the prior art by providing a method and apparatus for attracting insects above a person's head and away from an individual's face by means described above.

SUMMARY OF THE INVENTION

The general purpose of the present invention is a method and apparatus for attracting insects away from a person's head, and more specifically, a device or securing onto a hat, such as a common baseball hat, fishermen's hat, etc., and including an upper member coated with an insect attractant.

According to one embodiment of the present invention, there is provided a clip member at one end and a member at the other end coated with an insect attractant. The clip can be a spring clip, an alligator clip, a head-encircling structure, or any other type of structure for securement onto a hat or adjustable headband. The other end can include a member, such as a styrofoam ball, a piece of cardboard, or any other material suitable for advertising or attracting insects, coated or impregnated with an insect attractant or reflectant for safety purposes.

Significant aspects and features of the present invention include a device for attracting insects which clips to a hat and includes an elevated member with an insect attractant for attracting insects, such as gnats, flies, mosquitoes, etc.

Another significant aspect and feature of the present invention includes a device which can be coated with a reflectant, and can be worn by children or adults during evening hours to reflect car headlights or boat lights during cycling, jogging or fishing.

Having thus described the embodiments of the present invention, it is a principal object hereof to provide a member for attracting insects, including a coated or impregnated member secured to a clip member at the other end for clipping onto a hat.

One object of the present invention is to provide a member with insect attractant which is supported by a longitudinal member which clips onto an individual's hat to attract insects away from an individual's head.

Another object of the present invention is to provide a device which can be coated with a reflectant and can be worn by children or adults during evening hours to reflect car headlights or boat lights during cycling, jogging or fishing.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
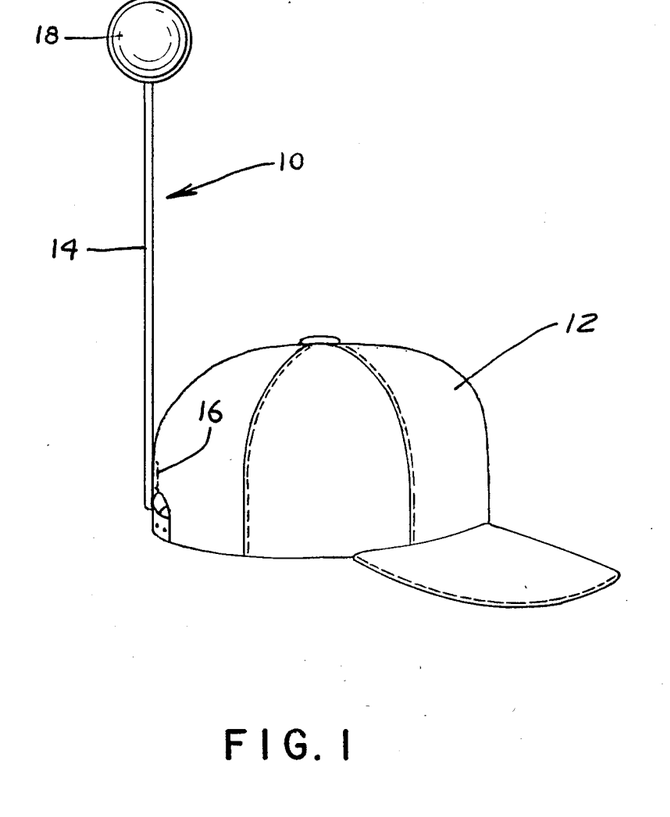
FIG. 1 illustrates an insect attractant system of the present invention clipped to a hat.

FIG. 1 illustrates an insect attractant system 10 affixed to a hat 12. The insect attractant system 10 includes a longitudinal member 14, such as a rod or rectangular bar; a clip structure 16 secured at one end and later described in detail; and a round member 18, such as a styrofoam ball, coated or impregnated with an insect attractant for attracting insects, such as gnats, mosquitoes, flies, general insects, or any other type of insect or bug, especially the flying type of insects that distress a person's face and body. The surface can further include a reflectant coating for safety purposes. The round member 18 could assume the shape of a flower for a female wearer of the hat. A representative coating can include chemicals from the following group as set forth in Table 1.

TABLE 1

Figure 2:
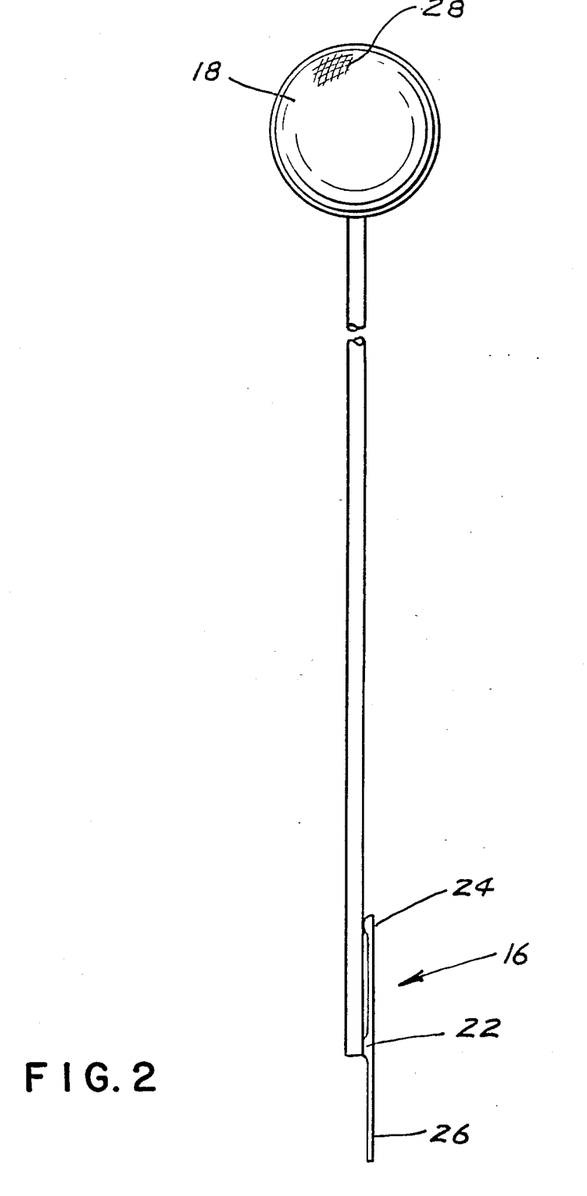
FIG. 2 illustrates one embodiment of the insect attractant system.

1. coating carrier
2. inert material
3. rosin
4. scent
5. mineral oil
6. wax
7. rubber FIG. 2 illustrates a plane view of the insect attractant system 10 including longitudinal member 14, the clip structure 16 and the round member 18. The longitudinal member 14 can be a rod or bar stock of sufficient strength to support an upper member and a clip structure. The clip structure 16 can be that similar to a pen or pencil clip and includes a securement point 22, an engagement member 24, and an optional extension member 26 for extending into the hat band. The securement point 22 and the extension member 26 provide for two-point securement. The round member 18 can be any member whether it be round, flat or any other predetermined geometrical shape and/or a reflective coating or impregnated with an insect attractant 28. The insect attractant 28 attracts gnats, flies, mosquitoes, flying bugs, or any other type of insects.

Figure 3:
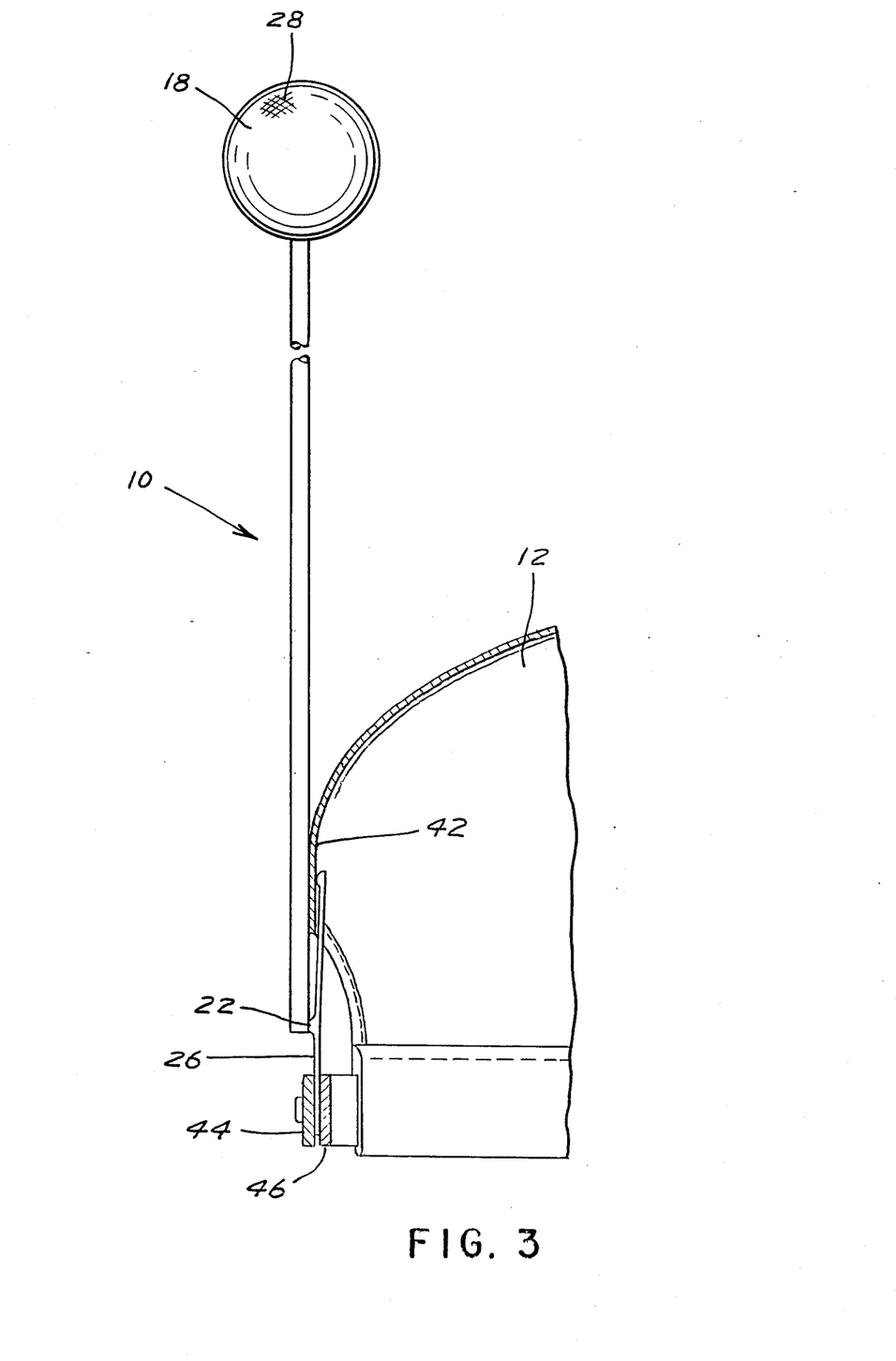
FIG. 3 illustrates a cross-sectional view of the insect attractant system affixed to a hat.

FIG. 3 illustrates a cross-sectional view of the insect attractant system 10 on the hat 12. All numerals correspond to those elements previously described. Illustrated in cross section is the hat 12, including a back section 42 and two band members 44 and 46 which are adjustable with snaps or other like structures as known in the art. The insect attractant system 10 snaps onto the back of the hat 12 and the lower portion of the extending member secures through the band members 44 and 46. The round member 18 can resemble a golf ball by way of example and for purposes of illustration only and not to be construed as limiting of the present invention.

MODE OF OPERATION

The round member 18 coated with insect attractant or reflectant can be packaged, such as in a cellophane package to preserve the chemical composition of the insect attractant. The round member 18 is then placed onto the top of the longitudinal member 14 and the cap is then placed onto a person's head. Gnats, flies, mosquitoes, bugs and insects or other creatures of the air are then attracted to the region above one's head.

DESCRIPTION OF THE FIRST ALTERNATIVE EMBODIMENT

Figure 4:
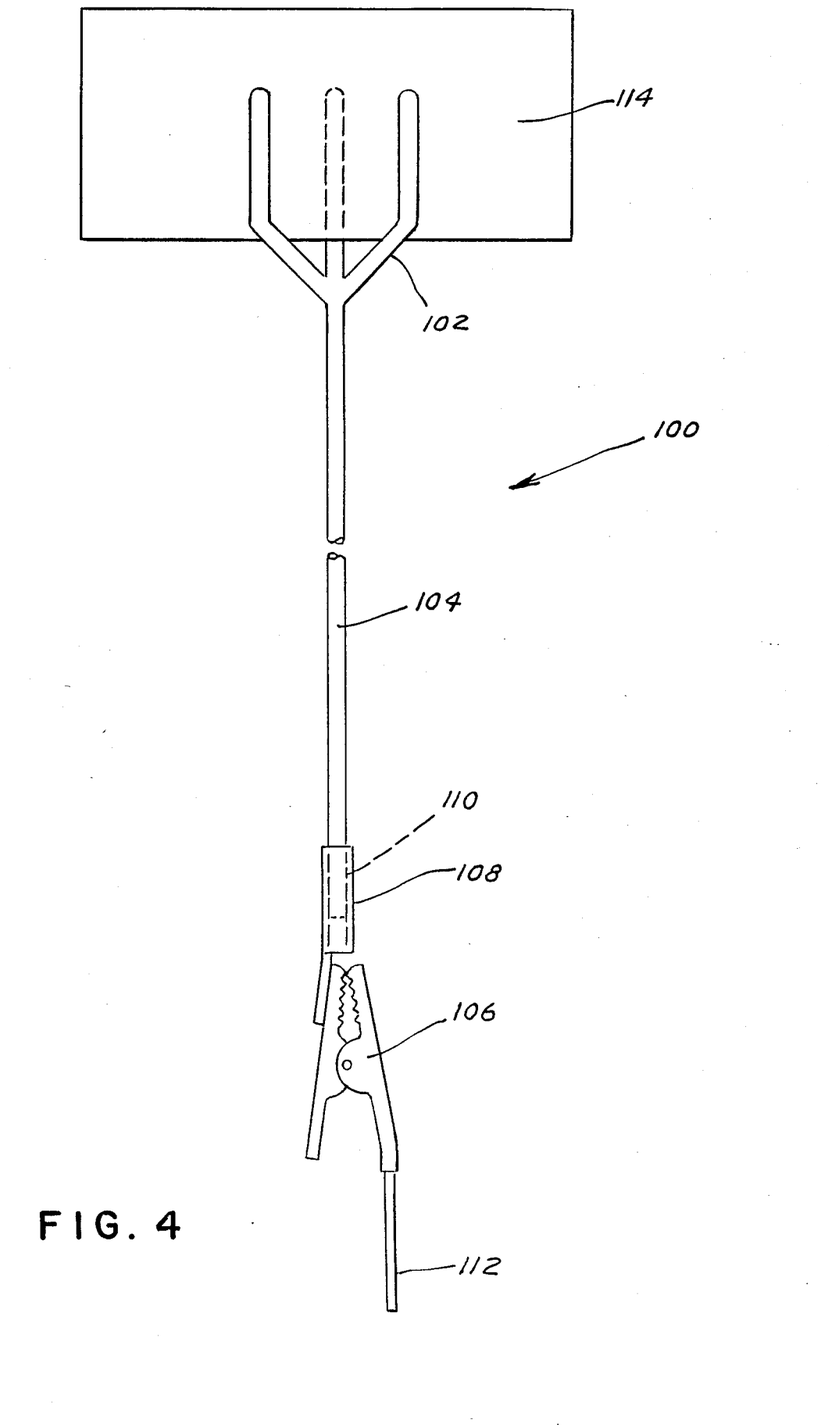
FIG. 4 illustrates a first alternative embodiment.

FIG. 4 illustrates a first alternative embodiment of an insect attractant system 100, including a forked longitudinal member 102, a longitudinal member 104 and a clip 106. The clip 106 can secure directly to the bottom of the longitudinal member 104 or it can use a bridging member 108 including a hole 110 for the longitudinal member and a extension member 112. The clip 106, in this example, is an alligator clip and includes an extension member 112 extending downwardly to secure in the hat band for additional support. A scented member 114, such as with advertising or printing, secures into the fork 102 between the prongs and is scented with an insect attractant. The cards or inserts can include printed messages, such as for liquor or cigarettes or any advertising. The operation of the insect attractant system 100 is that as previously described for FIGS. 1-3.

DESCRIPTION OF THE SECOND ALTERNATIVE EMBODIMENT

Figure 5:
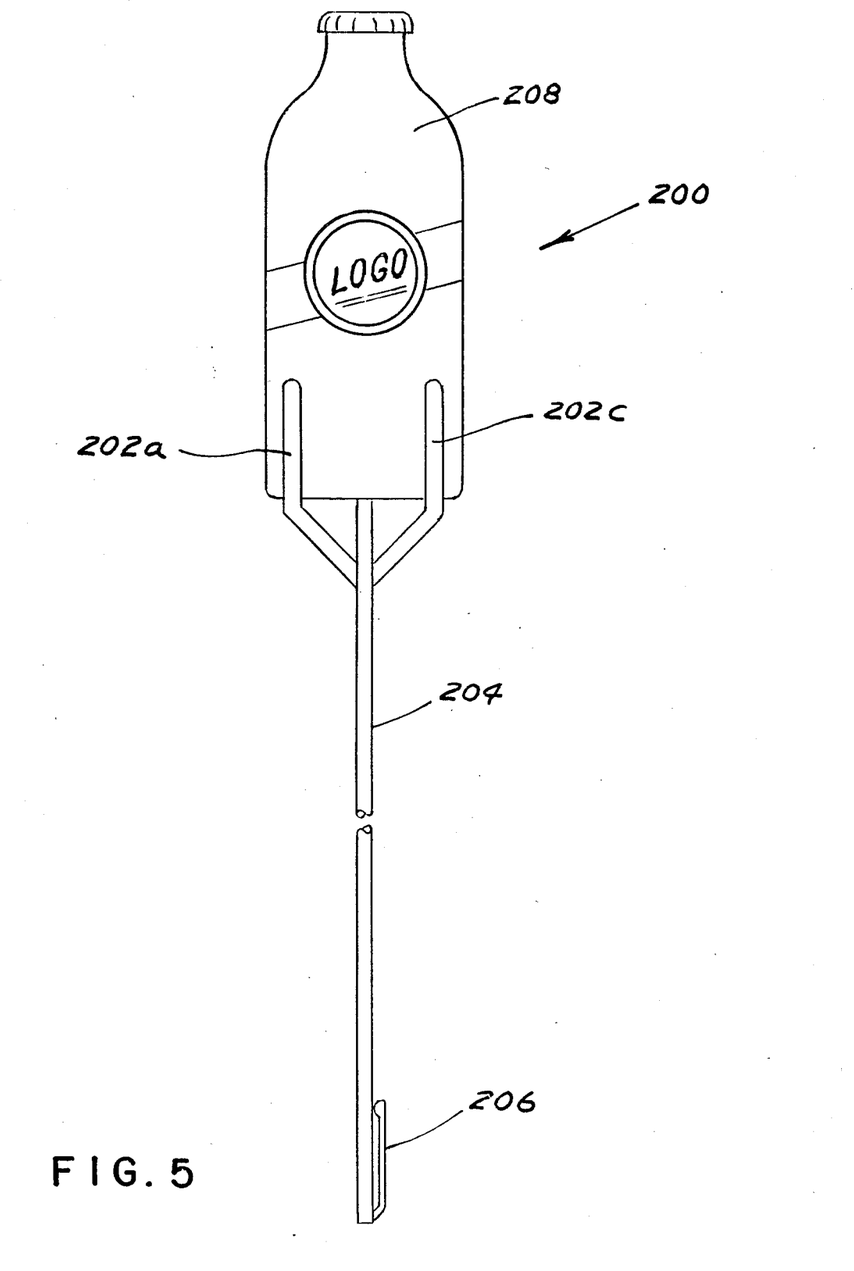
FIG. 5 illustrates a second alternative embodiment.
Figure 6:
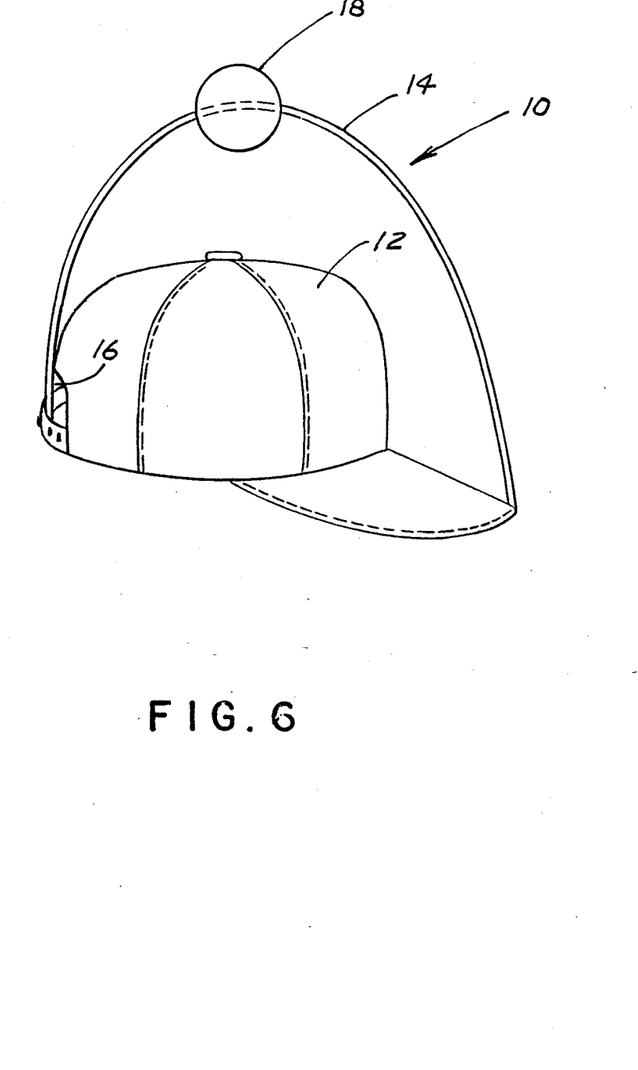
FIG. 6 illustrates a third alternative embodiment.
Figure 7A:
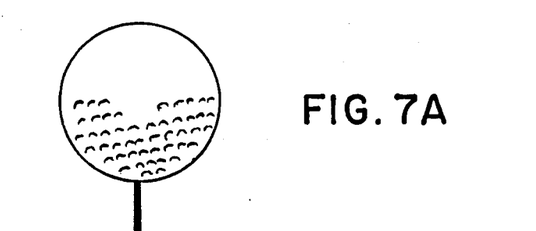
FIGS. 7A-7E illustrate representative advertising flags for the fork.
Figure 7B:
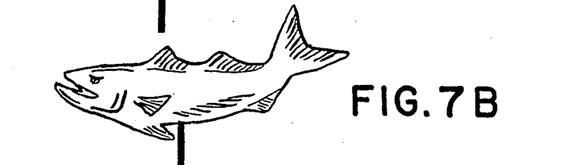
Figure 7C:
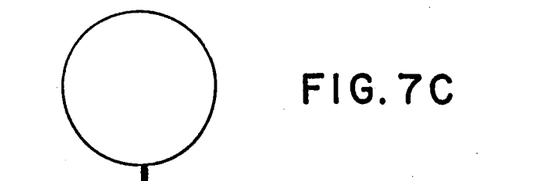
Figure 7D:
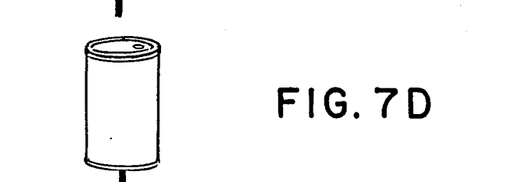
Figure 7E:
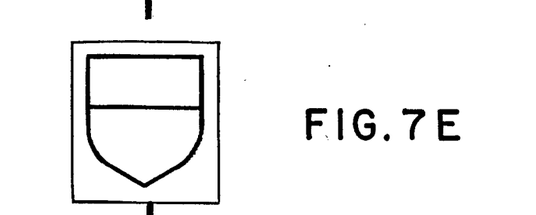
Figure 8A:
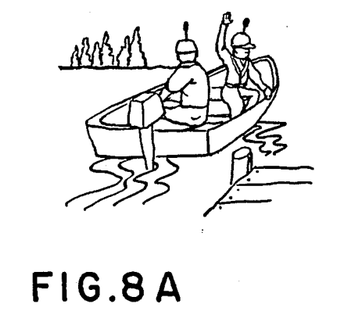
FIGS. 8A-8F illustrate representative modes of operation.
Figure 8B:
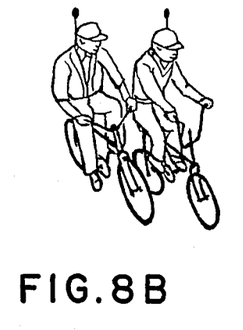
Figure 8C:
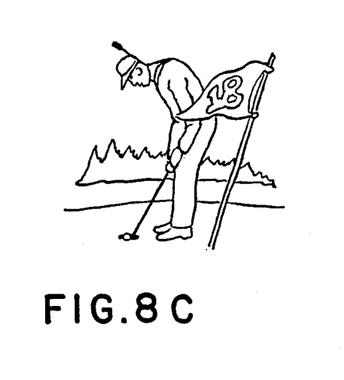
Figure 8D:
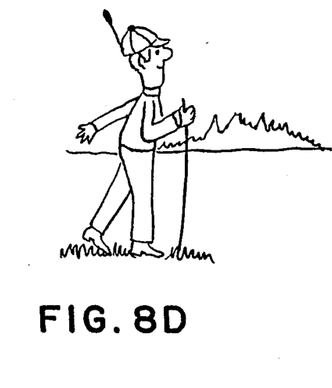
Figure 8E:
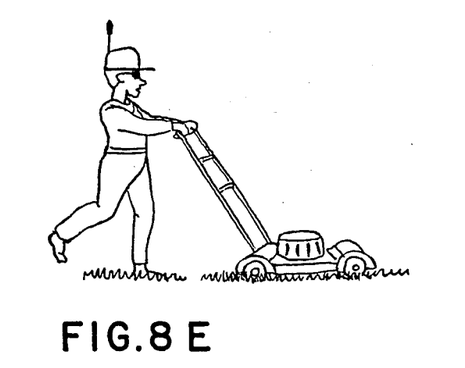
Figure 8F:
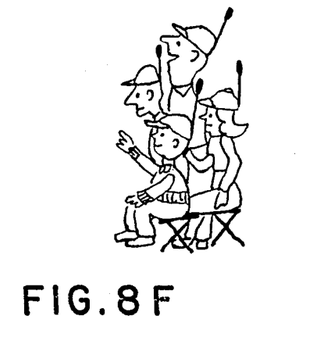

FIG. 5 illustrates a plan view of an insect-attractant system 200 including a fork assembly 202a-202c, longitudinal support member 204, and a clip 206. A scented insert card 208 assuming predetermined geometrical shape, such as a beer bottle in this instance, secures in frictional engagement between the fork assembly 202a-202c. Operation of the system is like that as previously described for FIGS. 1-4.

Various modifications can be made to the present invention without departing from the apparent scope hereof.

I claim:

1. Process for attracting insects above one's head comprising the steps of:
   a. securing a member coated or impregnated with an insect attractant to one end of a longitudinal member;
   b. clipping the other end of the longitudinal member onto a hat; and,
   c. spacing the coated member on said longitudinal member a substantial distance above said hat;
   d. placing the hat upon one's head thus attracting said insects to a position substantially above one's head.

2. Process of claim 1 wherein said insect attractant member is shaped as a golf ball.

3. Process of claim 1 wherein said insect attractant member is shaped as a beer bottle.

4. Process of claim 1 wherein said insect attractant member is shaped as an advertising card.

5. In combination, a hat and a insect attractant comprising:
   a. a hat including a half-spherical member for covering one's head and secured about a hat rim; and,
   b. insect-attractant system including a elongated longitudinal member, a clip means at one end and substantially parallel to said longitudinal member, wherein said substantially parallel clip means comprises a first portion extending along a length of said longitudinal member, and a second portion extending in an opposite direction beyond said one end of said longitudinal member and engaged between adjustable bands of a hat, and a member with a coated or impregnated insect attractant at another end, whereby said clip secures said longitudinal member supporting said coated or impregnated member within said attractant to said hat.

6. Combination of claim 5 wherein said hat is a baseball cap with an adjustable strap in the rear of said hat.

7. Combination of claim 5 wherein said hat is a golf hat with an adjustable strap in the rear of said hat.

8. Combination of claim 5 wherein said hat is a fishing hat with an adjustable strap in the rear of said hat.

9. Combination of claim 5 wherein said member includes a reflective coating.

10. Combination of claim 5 wherein said member is in the shape of a flower for a female.

11. Insect-attractant system comprising:
   a. elongated longitudinal member;
   b. clip means secured at one end of said longitudinal member and substantially parallel to said longitudinal member, wherein said parallel clip means comprises a first portion extending along a length of said longitudinal member, and a second portion extending in an opposite direction beyond said one end of said longitudinal member and adapted for engagement between adjustable bands of a hat; and,
   c. insect attractant member secured at another end of said longitudinal member and coated or impregnated with a chemical to attract insects.

12. System of claim 11 wherein said upper end of said longitudinal member includes a fork means for securing an insert card coated or impregnated with insect attractant.

13. System of claim 11 wherein said upper end of said longitudinal member includes a head-encircling means for securing an insert card coated or impregnated with insect attractant.

14. In combination, a hat and an insect attractant system comprising:
   a. a heat including a half-spherical member for covering one's head and secured about a hat rim; and
   b. insect-attractant system including an elongated longitudinal member, a clip means at one end and substantially parallel to said longitudinal member;
   wherein said parallel clip means comprises a first portion extending along a length of said longitudinal member, and a second portion extending in an opposite direction beyond said one end of said longitudinal member and engaged between adjustable bands of a hat;

and a member comprising a predetermined geometrical shape with a coated or impregnated insect attractant and with advertising material printed thereon, spaced at a substantial distance on said longitudinal member from another end; and, whereby said clip secures said longitudinal member, supporting said coated or impregnated member with said attractant, to said hat.

15. In combination, a hat and an insect attractant system comprising:
  a. a hat including a half-spherical member covering one's head and secured about a hat rim; and,
  b. insect-attractant system including an elongate longitudinal member, a clip means at one end and substantially parallel to said longitudinal member;

wherein said parallel clip means comprises a first portion extending along a length of said longitudinal member, and a second portion extending in an opposite direction beyond said one end of said longitudinal member and engaged between adjustable bands of a hat;

and a member comprising a predetermined geometrical shape with a coated or impregnated insect attractant spaced at a substantial midpoint on said longitudinal member and an other end secured to a forward portion of said hat, by a securing means, forming an arcuate longitudinal member; and, whereby said clip secures said longitudinal member, supporting said coated or impregnated member with said attractant about a high point of said hat.

* * * * *